United States Patent
Schoch et al.

(10) Patent No.: US 6,209,400 B1
(45) Date of Patent: *Apr. 3, 2001

(54) PORTABLE PRESS VIBRATION SEVERITY MONITORING SYSTEM AND METHOD

(75) Inventors: Daniel A. Schoch, Minster; Robert E. Klein, New Bremen; Kevin J. Ever, Fort Recovery, all of OH (US); David Schroeder, Flint, MI (US)

(73) Assignee: The Minster Machine Company, Minster, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,047

(22) Filed: Oct. 24, 1997

Related U.S. Application Data

(60) Provisional application No. 60/035,028, filed on Jan. 13, 1997.

(51) Int. Cl.[7] ........................................ G01B 7/16
(52) U.S. Cl. ............................... 73/778; 73/597
(58) Field of Search .................... 73/588, 597, 598, 73/602, 649, 778, 774

(56) References Cited

U.S. PATENT DOCUMENTS

| | | |
|---|---|---|
| H381 | 12/1987 | Pounds et al. . |
| 4,023,044 | 5/1977 | Miller et al. . |
| 4,195,563 | 4/1980 | Budraitis et al. . |
| 4,408,285 | 10/1983 | Sisson et al. . |
| 4,453,421 | 6/1984 | Umano . |
| 4,461,182 | 7/1984 | Jones, Jr. et al. . |
| 4,723,429 | 2/1988 | Weber et al. . |
| 4,774,842 * | 10/1988 | Kollar et al. ............................. 73/640 |
| 4,967,605 | 11/1990 | Okada . |
| 4,974,164 * | 11/1990 | Lewis et al. ............................. 33/707 |
| 5,027,631 | 7/1991 | Naito . |
| 5,249,138 * | 9/1993 | Piety, Jr. et al. ....................... 702/57 |
| 5,517,183 * | 5/1996 | Bozeman, Jr. ......................... 73/503 |
| 5,518,008 * | 5/1996 | Cucchiaro et al. ................... 128/777 |
| 5,633,811 * | 5/1997 | Canada et al. ......................... 702/56 |

FOREIGN PATENT DOCUMENTS

| | | | |
|---|---|---|---|
| 39 38 854 A1 | 11/1989 | (DE) | B30B/15/28 |
| 0 23 092 | 1/1981 | (EP) | B23Q/11/00 |
| 0710841 A2 | 5/1996 | (EP) | G01P/3/48 |
| 08226847 | 3/1996 | (JP) | G01H/1/00 |
| WO 97/06405 | 2/1997 | (WO) | G01B/7/16 |

* cited by examiner

Primary Examiner—Max Noori
(74) Attorney, Agent, or Firm—Randall J. Knuth

(57) ABSTRACT

The invention is directed to a hand held device attachable to a mechanical press to measure press conditions. The device includes signal processing circuitry for processing a corresponding signal developed from an accelerometer. The signal processing circuitry has acceleration processing circuitry for calculating a press acceleration signal, a velocity processing circuitry for calculating a press velocity signal, and displacement processing circuitry for calculating a press displacement signal. Display circuitry is used for displaying at least one of said calculated signals. A multi-contact switch connect the acceleration, velocity, and displacement processing circuitry together permitting an operator to select one of the calculated signals for input to the display circuitry. A method of utilization of the device is also described.

27 Claims, 6 Drawing Sheets

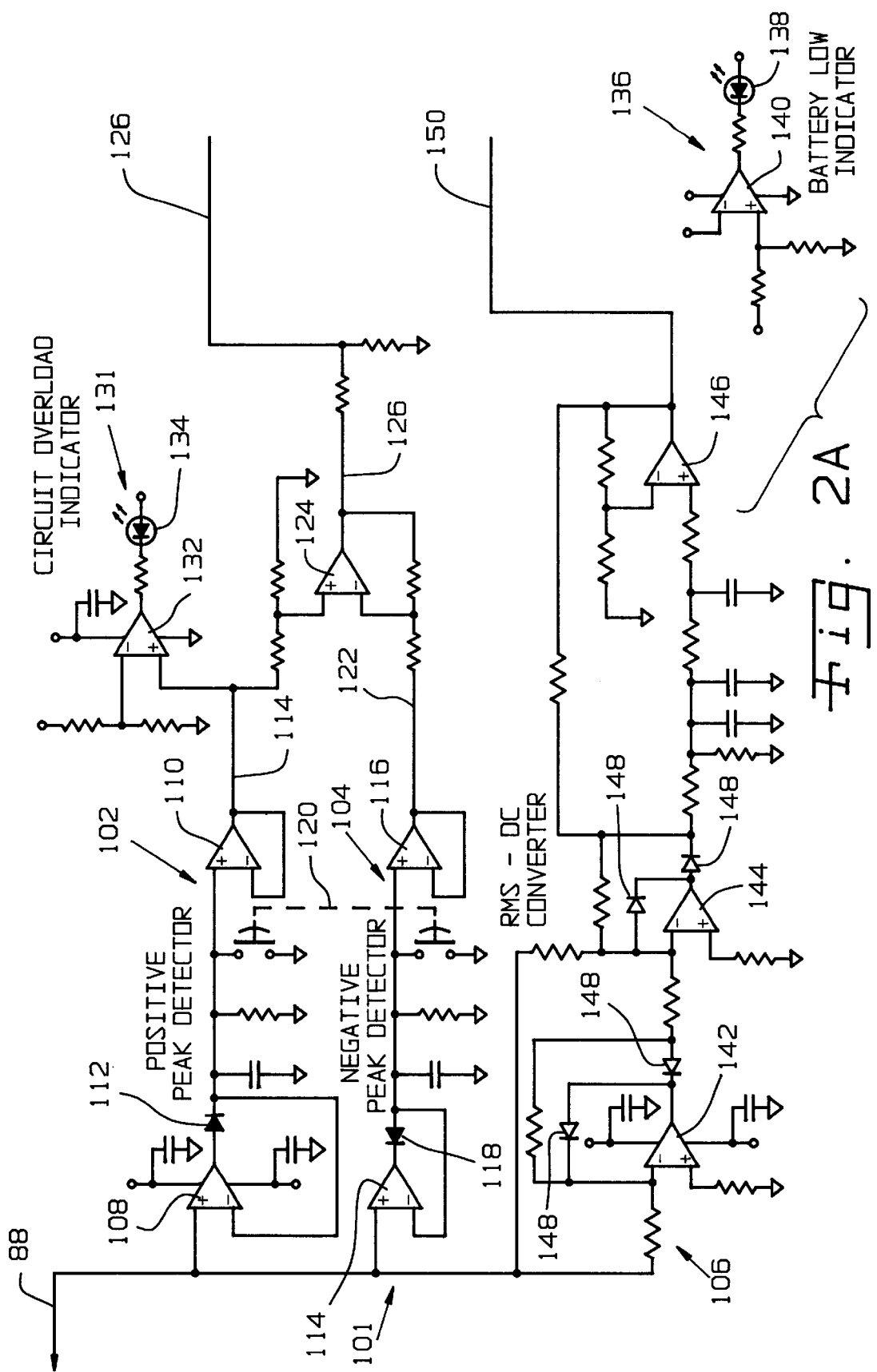

PORTABLE PRESS VIBRATION SEVERITY MONITORING SYSTEM AND METHOD

This application claims benefit to Provisional Application 60/035028 filed Jan. 13, 1997.

BACKGROUND OF THE INVENTION

1. Field of the Invention

The present invention relates generally to press vibration monitoring and more particularly, to a method of generating a press load/speed vibration severity capacity indicator for the determination of press/die long-term operating reliability during production operation and to an apparatus utilizing the information generated by the above method in monitoring press vibration severity.

2. Description of the Related Art

The traditional method for calculating the tonnage of a press die is mainly by a means of static load calculation. A given die has a certain material shear length and a stock material with a certain thickness. From this, the tonnage of the die or the force necessary to shear or form the part may be calculated. Traditional press sizing has been based on "static 11 die shear loading as calculated using the equation; [Shear Length (in.) [Thickness (in.)] [S. (lb/in2)]=Shear Load (lb).

This load (plus forming and blanking static loads) has traditionally been considered the only significant load and thus the peak dynamic load of the press. Generally, on shorter machines at speeds below 300 strokes per minute, dynamic effects are not a major influence on die application severity. As press speeds are increased however, there are several other dynamic influences which become present, thereby creating additional press loadings in addition to increases produced by the actual shear loading above the traditional static calculated value. In many cases, these dynamic loads surpass the shear load as the peak dynamic load. In addition to greater effective shear loads, additional impact forces are created as press speed increases, which further contributes to the vibration of the press structure.

It has been found through experimentation, that as the press speed increases there are impact magnifications to static loads as well as several additional loads that occur that are not present at slower press speeds. There are actually several different sources of additional die load parameters that many press operators, production managers, or owners do not necessarily know exist. At higher speeds, even though not exceeding the capacity of the press, the press requires more force to make the part, which in turn creates a different set of more severe vibration conditions.

At higher press speeds, in the press structure, the loads are applied much more quickly, are released more quickly, and in general are producing a much stronger shock wave which is dispersed and dissipated through the press structure. By increasing the speed of the press, the slide velocity at any given point above the bottom dead center position is increased, thereby increasing the impact forces of the punches on the stock material. These impact force increases are related to the square of the velocity. Therefore, press speed is one of several factors increasing vibration in the press. By running the press at higher speeds, more severe vibration is transmitted through the press.

A second factor contributing to press vibration is the stroke length, which increases the impact forces and loading on the press. A third factor is the contact distance of the die punches and stripper plate above bottom dead center. The higher these components contact above bottom dead center, the greater the impact velocity and, therefore, the more severe the vibration level.

Another factor relative to press vibration increase is the stored energy released during the manufacture of the part. Deflections occur on the press structure during loading of the die. As the stock material fractures through, called snap through, the release of the stored deflection energy sends a vibration shock wave through the press structure. The released stored energy also has the ability to accelerate the slide downward, which can cause the die punches to penetrate the stock material more deeply. As the applied load increases, so does the stress and deflection levels within the press structure, therefore causing increased energy release and increased vibration.

Yet another factor which affects the press structure and vibration is the use of flattening stations or stop blocks. If these devices are utilized in the die, then additional loads and impact forces are present. As press speed increases, the press shutheight will naturally close in, which, if stop blocks are utilized, will cause a larger load to be applied. The press shutheight naturally closes in as press speed increases due to the inertia forces developed.

Still another factor is the thermal shutheight effect. Again, as speed is increased, there is a viscous shear of the oil within the press crankshaft and other bearing clearances. The heat generated from the shear of the oil is conducted through the press structure and drive connections, causing the shutheight to dimensionally close in more deeply.

Thus, the above described dynamic effects that occur during press operation increase the loading and overall vibration levels induced in the press structure, all of which increase with an increase in press speed.

Vibration stress magnifications, created by dynamic load increase, can cause many problems to press structures. Cracks can develop over time in the castings anywhere within the press structure or its parts if long term dynamic load increases are unknown or go ignored. Broken structural and component parts such as tie rods, crankshafts, crowns, slides and dynamic balancers have been reported, and in all instances the vibration severity has been able to be correlated by field service failure data to develop specific threshold vibration severity levels measured on the press structure during production. At certain definable vibration severity levels, stress magnification levels will be present thus creating increased maintenance severity problems for the press.

The relative life of a press is thus determinable from the accumulative effects of the vibration severity levels experienced over this period of time. A press may withstand high vibration levels without major structural damage if the duration period is relatively short. Also, a press will certainly withstand low vibration levels without structural damage no matter what the duration period.

Accumulative structural damage will occur, however, when a press is run in a magnified stressed condition as a result of medium to high vibration severity levels over a longer duration period whether run continuously or intermittently. The damage will not necessarily be evident in the early stages but will begin to appear over time.

Vibration monitoring systems of the prior art require that a no load response level be determined with periodic no load checking of the relative level at several specific component locations, to try to evaluate the progress of component deterioration.

What is needed in the art is a portable apparatus which measures the actual application vibration severity levels while in actual production, which allows the press operator, tooling engineer, production manager, or owner to know the long term reliability effects of running the press at any combination of sensed speed and load, by monitoring the actual vibration severity level of the die application via measurement of press RMS velocity by means of an accelerometer, and comparing the corresponding operating vibration severity level to a vibration severity zone chart.

SUMMARY OF THE INVENTION

Generally, the present invention provides a method and apparatus for the identification of dynamic press load/speed vibration severity capacity and for the determination of press/die long-term operating reliability during production operation for presses of a given design.

More specifically, the process of the present invention measures the vibration severity levels of actual die applications, and electronically converts these measurements to identify the zones for press operating reliability generated by the use of an accelerometer sensor. The system reports vibration severity zones during press production operation. The zones thus established relate the press RMS velocity vibration severity level to the potential long-term operating reliability for the particular press as follows:

Zone 1 Extreme Long-Term Reliability;
Zone 2 Very Good Long-Term Reliability;
Zone 3 Reliable (With Caution); and
Zone 4 Not Advisable For Long-Term Reliability.

During actual press production operation, RMS velocity vibration is monitored, processed and displayed. A sensor, which is preferably an accelerometer, is placed on a location of the press. A calibrated electrical circuit converts the press acceleration signal to determine a press velocity signal, a press displacement signal or an RMS velocity measurement within a roll off frequency range of approximately 10 to 100 Hertz.

The present invention advises of the level of vibration severity and long term reliability of metal forming presses for any application, run at any speed with any material. Previous preventive maintenance vibration monitoring only monitors no load changes to a base reference level of specific components, attained through no load reference level analysis. The previous prior art preventive maintenance vibration level measured under no load conditions do not accurately reflect actual production vibration conditions, as does the present vibration severity monitoring system.

Thus, for reliable long-term press production operation, a particular press must be operated within zones of safe load/speed dynamic combinations which will cause acceptable levels of press vibration severity. Each different press design will have certain inherent vibration dissipation characteristics which will allow it to be safely operated with long term reliability within a range of production speeds and dynamic load combinations.

Each singular press may be monitored using an integral console monitor, or a plurality of presses, alternatively, may be monitored using a single portable measurement unit. A press is monitored during production utilizing the following apparatus.

The invention comprises, in one form thereof, includes a hand held device attachable to a mechanical press to measure press conditions comprising an accelerometer for measuring press conditions and creating a corresponding signal and a hand held signal processing means for processing the corresponding signal. The signal processing means is connected to the accelerometer to process the corresponding signal including the following branch circuits: an acceleration processing means for calculating a press acceleration signal; a velocity processing means for calculating a press velocity signal; and a displacement processing means for calculating a press displacement signal.

A display means is utilized for displaying at least one of the calculated signals with a switch connecting the acceleration, velocity, and displacement processing means together to thereby permit an operator to select one of the calculated signals for input to the display means.

The display means comprises a means for measuring the voltage of the calculated signals and digitally displaying the voltage as representing a press condition. Additionally, the display means includes a plurality of LED's arranged to illuminate at separate predefined applied voltage ranges whereby an illuminated LED represents a particular range for a signal input to the display means. The range corresponds to a particular vibration severity zone or range. The LED's illuminate in different colors depending on the predefined applied voltage range.

The invention comprises, in another form thereof, a method of monitoring vibration severity levels in a press comprising the steps of providing a hand held monitoring device that visually indicates press vibration severity levels in zone wise fashion, attaching a press sensor to the press and connecting the press sensor to the monitoring device, The press is run and the vibration severity level is determined based on the zone wise visual indicator on the monitoring device.

The invention comprises, in another form thereof, includes a hand held device attachable to a mechanical press to measure press conditions from a press accelerometer corresponding signal. A hand held signal processing means for processing said corresponding signal is included in the device, the signal processing means in communication with the accelerometer to process the corresponding signal. The signal processing means comprises at least two of the following processing means: an acceleration processing means for calculating a press acceleration signal; a velocity processing means for calculating a press velocity signal; and a displacement processing means for calculating a press displacement signal. The signal processing means further includes a display means for displaying at least one of said calculated signals and a switch connecting the two included processing means together and permitting an operator to select one of the calculated signals for input to the display means.

An advantage of the present invention over the prior art is to allow the press owner to instantaneously predict and determine the long term reliability effects of vibration being created during dynamic operation under various operating conditions such as speed and dynamic loading.

Another advantage of the present invention is that the device is hand held and portable, thereby field personnel may be able to check press operations easily and efficiently. Additionally, the system enables production or field personnel to monitor a number of different presses in quick succession, even presses that the field personnel have not seen before.

Another advantage is that there is virtually no setup necessary to obtain an accurate reading of vibration severity. Field personnel simply attach the accelerometer to a portion of the press bed or slide, turn ON the unit and read the selected indication.

Still a further advantage is of the present invention is that the device is attachable to a press in motion. There is no necessity or need to stop the press to determine vibration severity levels.

Another advantage of the present invention is that it contains signal processing circuitry to monitor positive and negative peak values and convert their signal levels utilizing unique a root means square (RMS) system converter to convert the signal into DC voltages. LED indicators are utilized for use by non technical personnel which are connected to particular voltage levels to indicate the different vibration severity zones as referenced above.

The present invention overcomes many prior art shortcomings by establishing almost instantly the vibration severity of a mechanical press created by its current operating application. This data is then used to guide the user in better understanding the risks being created, and thus operating the press more safely and under production conditions which promotes improved press and die longevity. This data can also be used to guide the user to selection of proper new presses for planned future production applications.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 2A and 2B schematically depict a portion of the present invention disclosing the positive and negative detector circuitry along with RMS to DC converter sections and with display indicators.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1A:
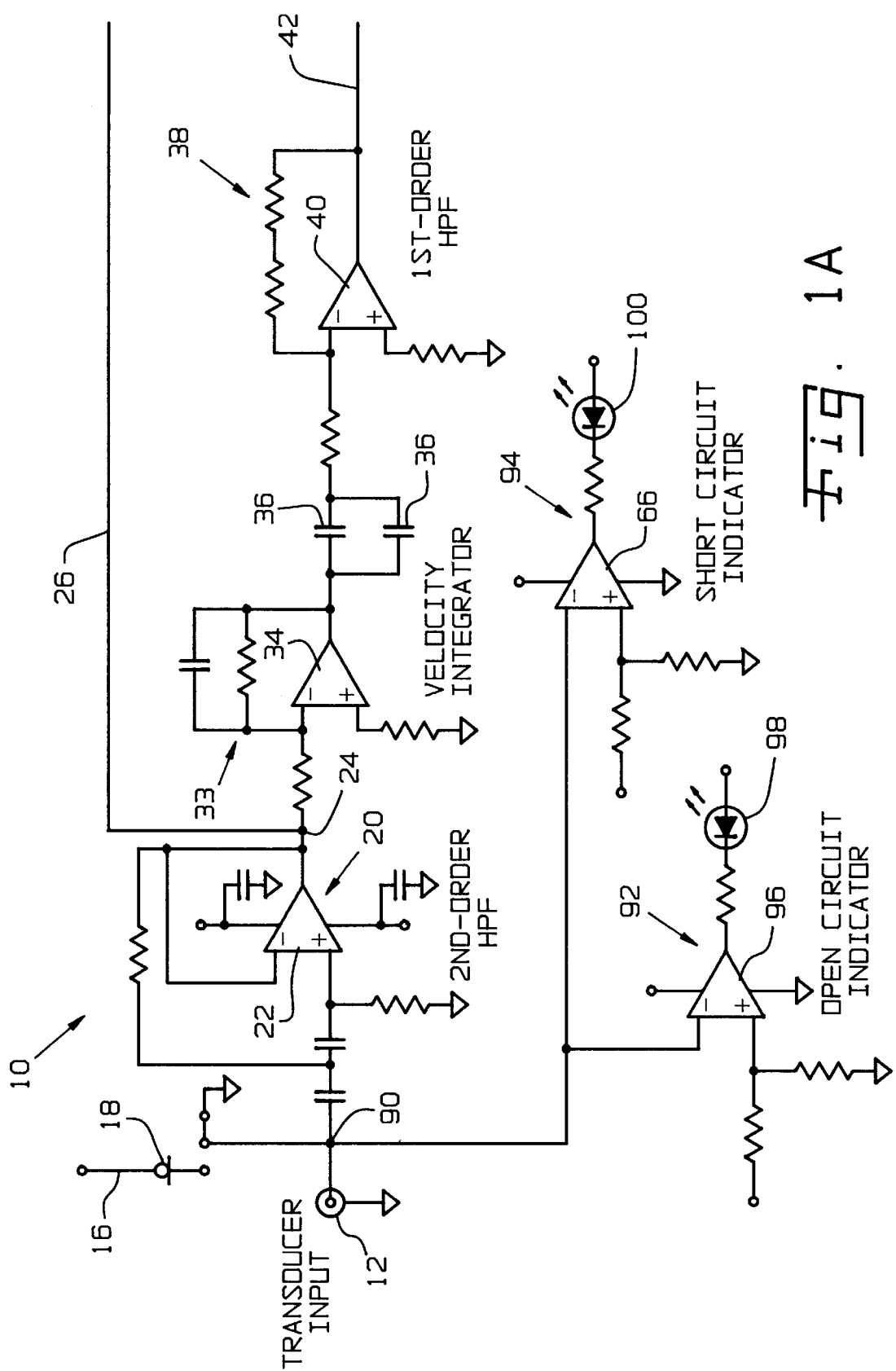
FIGS. 1A and 1B schematically depict one embodiment of the signal filtering portion of the circuitry of the present invention.
Figure 1B:
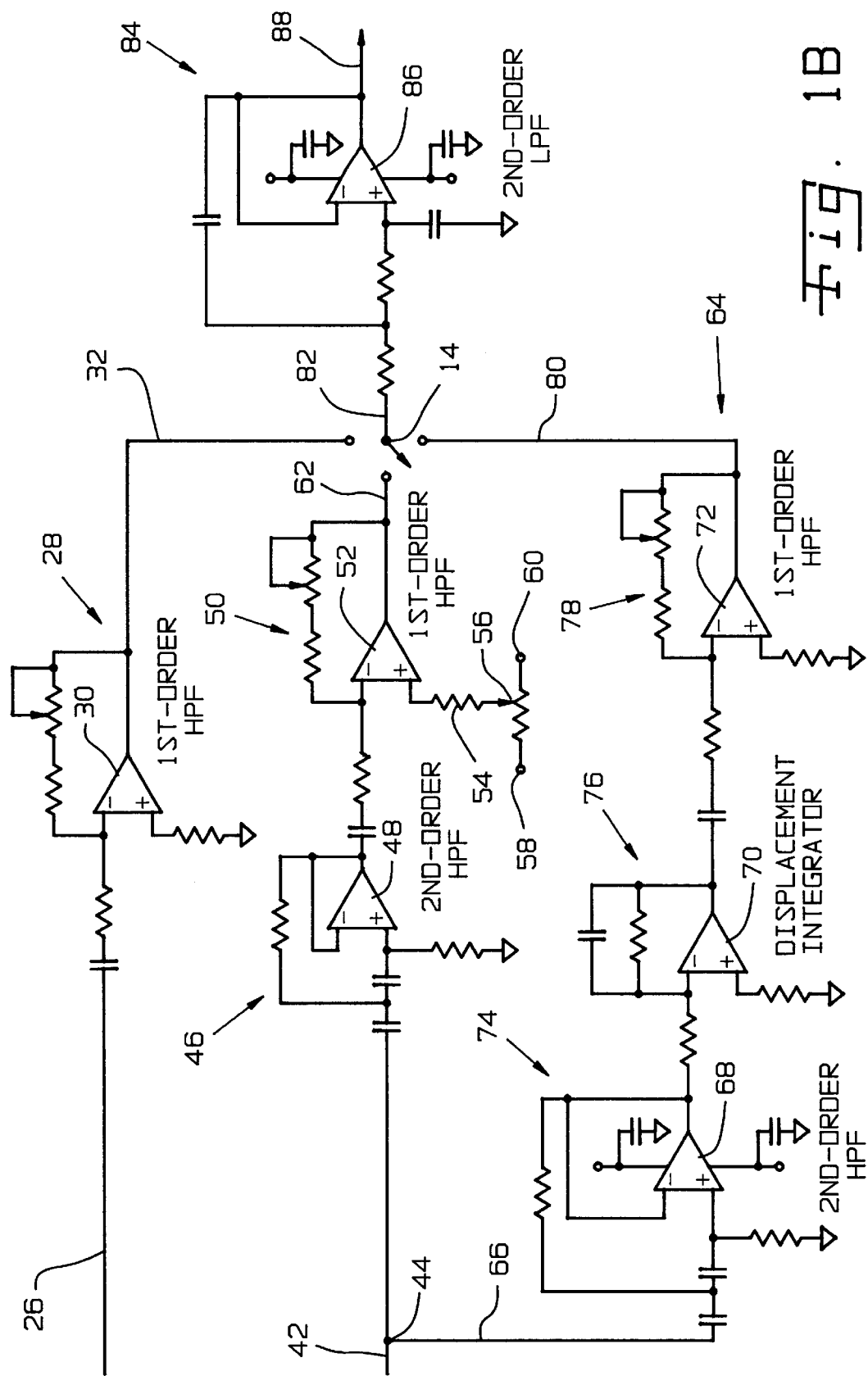
Figure 2B:
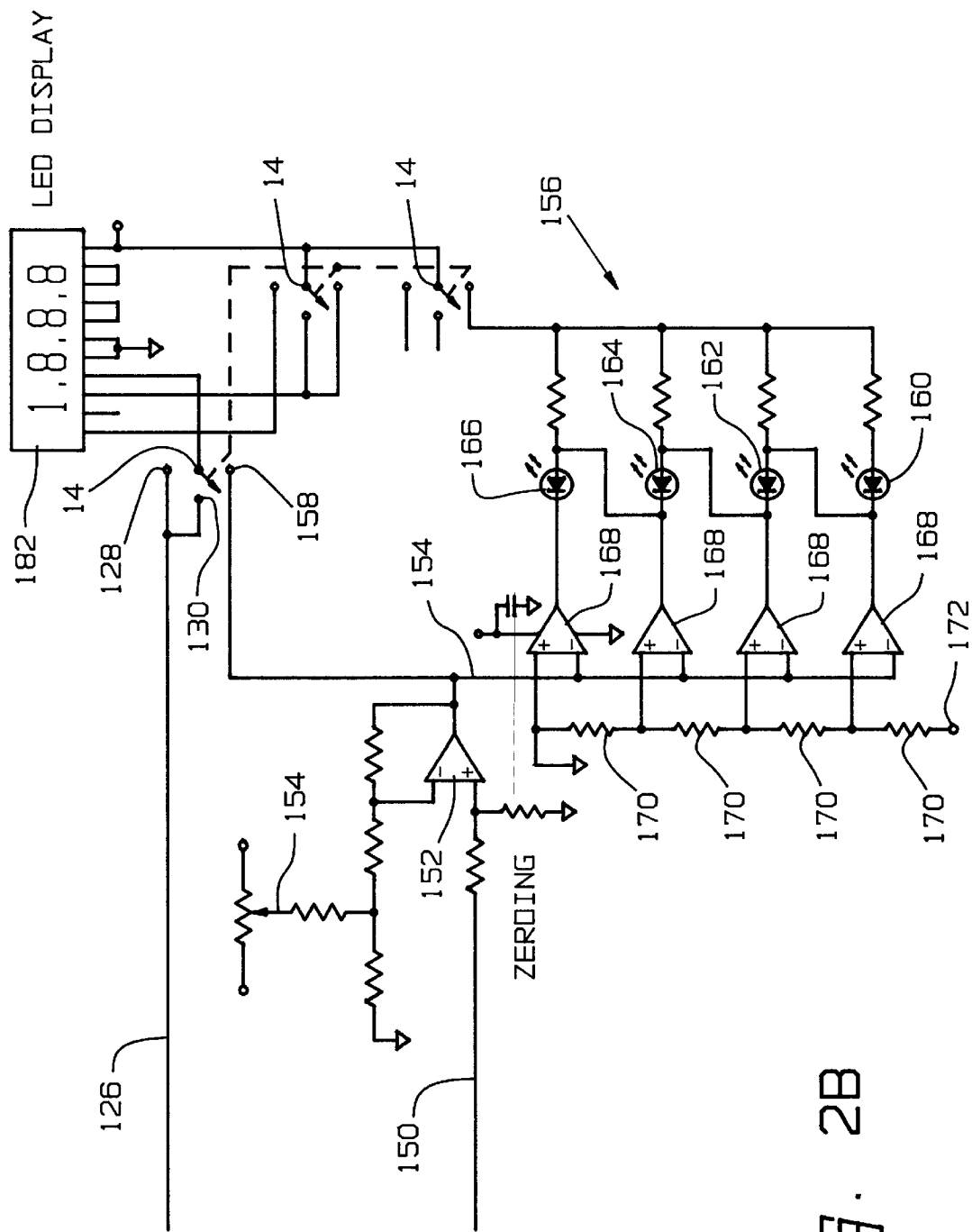
Figure 3:
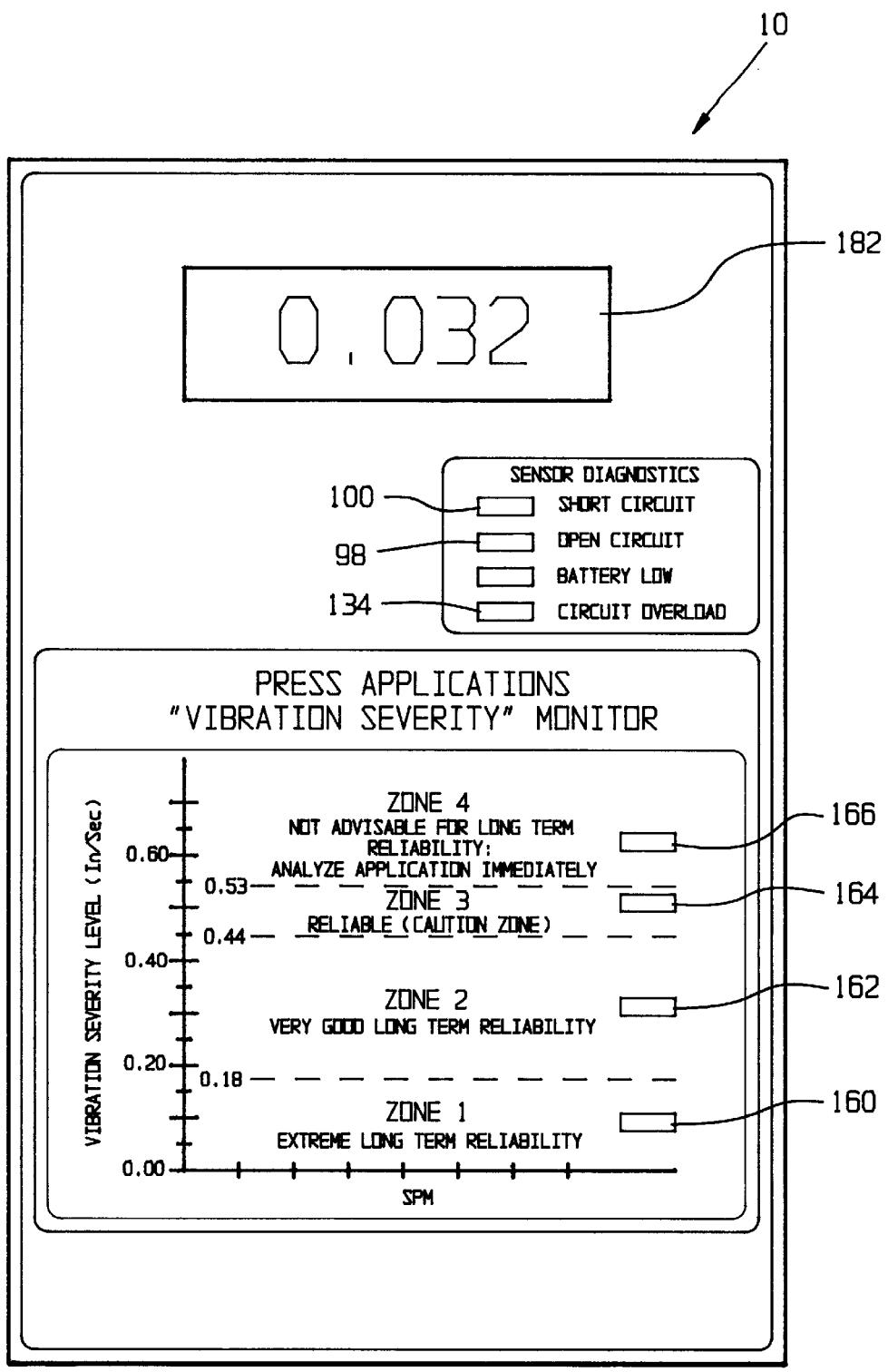
FIG. 3 is a front view of the hand held device of the present invention.

Referring now to the drawings, FIGS. 1 through 3, vibration severity monitoring system 10 of the present invention is shown.

In a general overall view, system 10 comprises a signal conditioning means for conditioning and displaying a signal from an accelerometer 12. The signal so obtained (i.e., a signal corresponding to and related to a press operating condition), is amplified and conditioned in three separate ways to obtain signals representing press displacement, press velocity, and press acceleration. One of these selected signals is conditioned by a peak to peak detector along with an RMS to DC voltage converter sub-circuit. This signal, now at a particular DC level, is then displayed by a volt meter and additionally displayed on a bank of LEDs designed to illuminate at particular voltage levels, thereby indicating a particular type of signal. These LEDs, when illuminated indicate which zone of vibration severity is currently being detected by accelerometer 12.

The operating power for system 10 is obtained from a battery or battery pack operating at 5 volts whose power is conditioned through Maxim M773/M743 DC power regulators (not shown) of conventional design and utilization. These types of regulators are capable of developing +/− 15 volt, and 24 volt DC power. Other alternate power sources would equivalently work such as power from AC adapter/transformers and like. System 10 is small and portable, adapted to be carried by an operator in one hand.

Referring now particularly to schematic diagrams 1A and 1B, single slide switch 14 is used to operate system 10 and select its various modes of operation. Switch 14 is a three position, multi-throw type switch. The modes of operation are inoperative when the batteries are disconnected, when the power is turned off, or when battery voltage is low. The power supply (not shown) includes regulator circuits and voltage control circuits which are of conventional design to provide output voltages of electrical power to operate system 10. The source of power, shown as line 16, operates at 24 volts. A constant current diode 18 provides power to accelerometer 12.

System 10 begins with the input signal creation, formed by an accelerometer 12. Accelerometer 12 is connected or attached to the bed or slide of a mechanical press (not shown). During operation of the press, acceleration thereof causes an output signal to be generated by accelerometer 12. This output signal is input to system 10 by a test lead or jumper cable 13 to junction point 90.

To begin the monitoring operation, press operation does not need to cease, but in this case connection or attachment of accelerometer 12 is to a non-rotating or non-reciprocating press portion, such as the press bed.

The first functional block of the signal processing subsystem is that of a second order highpass filter 20 which comprises an Operational Amplifier (OP AMP) 22. A majority of the OP AMPs utilized in system 10 are that of a LF347N quad operational amplifier type available from National Semiconductor, Inc. The output of second order highpass filter 20 is applied to junction point 24.

In this application, the term highpass filter is defined to mean an electrical filter that attenuates frequencies below a given frequency. Similarly, the term low pass filter is defined to mean an electrical filter that attenuates frequencies above a given frequency. Positive and negative 15 volts from the power regulator (not shown) is used to drive the OP AMPs of this invention.

This second order, highpass filter 20 shown with associated resistors and capacitors has a gain of approximately 0.0 Db at an approximate frequency of 1.0 Hz. A majority of the particular resistance and capacitor values are not shown since they are easily determined from the specification of the OP AMP utilized and basic electrical engineering design texts. The particular items that are not easily determinable are the frequency, gain and order of the bandpass filters utilized.

At junction point 24 the signal developed and conditioned from the second order highpass filter 20, is passed along through line 26 representing the acceleration of the press being monitored. That signal is passed through a first order highpass filter 28, using an OP AMP 30 of the same type previously discussed. This highpass filter has a gain of approximately 0.5 Db at an approximate frequency of 1.0 Hz. The signal received by first order highpass filter 28 via line 26 is thereby conditioned and passed along through output line 32 to one contact of switch 14.

Starting again from junction point 24, the velocity integration means of system 10 will be discussed. This subcircuit starts with an OP AMP 34 of the type previously discussed, set up by a connection of resistors and capacitors to create an integrator with a gain of approximately 1.3 Db at an approximate frequency of 0.7 Hz. This conditioned signal is passed through two capacitors 36 arranged in parallel. The signal then passes through a first order highpass filter 38 comprising of OP AMP 40, of the type previously discussed. This first order highpass filter 38 has a gain of approximately 1.0 Db at an approximate frequency of 1.0 Hz. The output signal from first order highpass filter 38 passes along line 42 to a junction point 44.

Continuing to analyze the velocity integration branch circuit, the signal arriving from junction 44 is applied to a second order highpass filter 46 comprising of an OP AMP 48, of the type previously discussed. The particular arrangement of capacitors and resistors with this second order highpass filter 46, create the necessary criteria of forming a filter with a gain of approximately 0.0 Db at an approximate frequency of 30.0 Hz. This eliminates unbalanced press motion effects created by press inertia from interfering and from being considered during velocity measurement.

This output from second order highpass filter 46 is then applied as an input to a first order highpass filter 50 comprising an OP AMP 52, of the same type previously discussed. The positive polarity pin of OP AMP 52 is provided with a resistor 54 connected to a potentiometer 56 having two ends 58 and 60, one of which is at negative 15 volts and the other at positive 15 volts potential. Potentiometer 56 permits zeroing the circuitry during calibration. First order highpass filter 50 has a gain of approximately 1.4 Db at an approximate frequency of 30.0 Hz.

This output signal conditioned by the previous series of OP AMPs is then output through line 62 to a contact of switch 14. The signal arriving at switch 14 through line 62 represents the velocity signal of the press measured with accelerometer 12. The displacement integration means of system 10 is shown as the third branch circuit 64 which branches off the velocity integrator branch circuit 38 at junction point 44. Line 66 attached to junction point 44 is the input line to displacement sub-circuit 64. Press displacement sub-circuit 64 includes three OP AMPs 68, 70 and 72 arranged in series, each having its own associated resistors and capacitors in standard configurations. Each of the OP AMPS 68, 70 and 72 are of the same LF347N Quad OP AMP described above.

OP AMP 68 is formed into a second order highpass filter with a gain of approximately 0.0 Db at an approximate frequency of 0.7 Hz. The output of OP AMP 68 is applied as the input to the displacement integrator 76. This displacement integrator 76 utilizes OP AMP 70 having a gain of approximately 0.7 Db at an approximate frequency of 0.7 Hz. The output of this displacement integrator 76 is then applied as an input to a first order highpass filter 78 utilizing OP AMP 72. This filter has a gain of approximately 0.8 Db at an approximate cutoff frequency of 3.0 Hz. The output of this subcircuit 64 comprising OP AMPs 68, 70 and 72 through line 80 is applied to a contact on switch 14. This signal represents the displacement value for the press monitored by accelerometer 12.

Dependent upon the user selected signal via switch 14, either that of acceleration from line 32, velocity from line 62, or displacement from line 80, is applied through switch 14 along line 82 to a second order low pass filter 84 comprised of OP AMP 86, of the type previously discussed. This filter has a gain of approximately 0.0 Db at an approximate frequency of 1.0 Kilohertz. The output of this second order low pass filter 84 is passed along line 88 to the detector and display subsections of system 10 as shown in FIGS. 2A and 2B.

Before discussing the detector sub-circuits, it is important to realize that system 10 has additional circuitry to indicate a short or open circuit from accelerometer 12. From junction point 90, as shown in FIG. 1A, the signal level is passed to both an open circuit detector 92 and a short circuit detector 94. Each of these detectors 92 and 94, utilize a portion of a LM339N quad comparator IC. The signal arriving from junction point 90 may indicates an open circuit when compared with the input power of 24 volts and a short circuit when compared with approximately 3 volts. If comparator IC 96 detects an open circuit, it will illuminate an attached LED 98. If comparator IC 66 detects an short circuit, it will illuminate LED 100.

Referring now to FIGS. 2A and 2B, the detector portion processing means 101 will now be described. As the conditioned signal is passed from the filtering sub-circuits through line 88, the signal is input to branch circuits 102, 104 and 106.

Both the positive peak detector and negative peak detector branch circuits 102 and 104, respectively, utilize the LF347N Quad OP AMP described previously. Positive peak detector, branch circuit 102 includes two OP AMPs 108 and 110 connected in series by a diode 112 in the direction indicated (FIG. 2A). The output from this positive peak detector 102 is applied to line 114. Sub-circuit 102 detects the positive peak of the substantially sinusoidal signal conducted through line 88.

Similarly, negative peak detector branch circuit 104 includes two OP AMPS 114 and 116 connected in series by diode 118 in the direction indicated. Sub-circuit 104 detects the negative peak of the substantially sinusoidal signal conducted through line 88. A reset switch 120 connects to the junctions of diode 112 and OP AMP 110, and diode 118 and OP AMP 116. This reset switch zeros both positive and negative peak protector branch circuits 102 and 104.

The output signal of negative peak detector 104 is conducted along line 122 to Op AMP 124. OP AMP 124 calculates the absolute value of the difference between the positive and negative peak detector branch circuits. This absolute difference is referred to as peak to peak. When switch 14 is selecting displacement, OP AMP 124 determines the peak to peak displacement of the press vibration measured and outputs a corresponding signal. When switch 14 is selecting acceleration, OP AMP 124 determines the peak to peak acceleration of the press vibration measured and outputs a corresponding signal. The output from this device is then applied through line 126 to two contacts, 128 and 130 of switch 14.

Shown in FIG. 2B, contact 128 of switch 14 supplies the peak to peak acceleration signal and contact 130 supplies the peak to peak displacement signal.

Referring back to the positive peak detector branch circuit 102 of FIG. 2A, from line 114, a circuit overload detector 131, utilizes a LM339N quad comparator 132. Upon an overload signal on line 114, detector 131 will cause an indicator LED 134 to illuminate. Depending on the type of accelerometer 12 used and the selection of OP AMPS utilized, the overload threshold value of the circuit will vary.

FIG. 2A shows another detector utilized within system 10. A low battery detector 136, utilizing a LM339N quad comparator 140, through selection of particular inputs and resistance values determines whether or not the power source, i.e., a battery, is below a threshold value. The low battery indicator LED 138 illuminates when the power source, i.e., the batteries, are outside of a particular voltage range.

The last branch of the detector subsection within system 10 is the unique RMS to direct current convertor 106. Branch circuit 106 includes a plurality of OP AMPS 142, 144 and 144 arranged in series, all of the type previously discussed. When switch 14 is selecting vibration, this branch circuit determines the RMS vibration of the press measured and outputs a corresponding signal. As shown in FIG. 2A, the polarity of diodes 148 full wave rectify the incoming signal from line 88, converting the varying signal to a particular DC voltage level.

This DC voltage level is provided to OP AMP 146 through various resistors and capacitor values that average this level over time and calculate the RMS (Root Mean Square) equivalent of the press vibration as sensed by accelerometer 12. The output of OP AMPs 142, 144 and 146, provide a unique RMS to DC conversion and supply same on line 150.

Referring to FIG. 2B, This unique RMS signal is passed along line 150 to zeroing OP AMP 152 of the type previously discussed. Variable potentiometer 154 permits zeroing the circuitry during calibration. The output from this zeroing stage is passed along line 154 which supplies this calibrated unique RMS signal to both a bank of LEDs 156 and to contact 158 of switch 14.

Bank of LEDs 156 includes, in this embodiment, four LEDs, 160, 162, 164 and 166 which correspond to the four zones of vibration severity level as described in the background of this application and U.S. Pat. No. 5,094,107 assigned to the assignee of the present invention, which specification is explicitly hereby incorporated by reference.

As shown in FIG. 3, the vibration severity zones 1 through 4 are represented through the illumination respectively of either an LED 160, 162, 164 or 166. Depending upon the unique RMS signal applied through line 154, four comparator ICs 168, a LM339N quad comparator IC, drive each one of the LEDs 160–166, respectively.

Based upon the particular resistor 170 values in series, and having a positive 15 volt level applied at connection point 172, each LED will be illuminated as the voltage applied from 154 surpasses the criteria of each comparator 168 as programmed by these resistor values. Each of the LED's 160, 162, 164, and 166 are used to represent the four levels of vibration severity zones, as shown in FIG. 3. In addition, LED's 160–166 are color coded such as per the following chart.

| LED | Color | Zone of Vibration Severity |
|---|---|---|
| 160 | Green | Zone 1- Extreme Long Term Reliability below .18 In/Sec RMS vibration |
| 162 | Green | Zone 2- Very Good Long Term Reliability from .18 In/Sec to .44 In/Sec RMS vibration |
| 164 | Yellow | Zone 3- Reliable (Caution zone) from .44 In/Sec to .53 In/Sec RMS vibration |
| 166 | Red | Zone 4- Not Advisable For Long Term Reliability above .53 In/Sec RMS vibration |

LCD display unit 180 is a numeric display utilizing an imbedded volt meter such as the type available from Crompton Modutec part number BL102-302. This LCD numeric display 180 has the signal directed to it from either line 126 or line 154 and such signal is displayed on the device face plate 182.

Calibration is performed separately for acceleration, velocity and displacement. A signal of known amplitude and frequency is inputted to transducer input 12. Potentiometers are then adjusted until the correct reading is displayed on the LCD display. Highpass filters 28, 50, and 78 include variable gains for calibrating acceleration, velocity and displacement respectively. The values of the input signal and output display are functions of the selected resistance and capacitance values through the entire circuit, thus calibration is simple one these valve have been selected.

Figure 4:
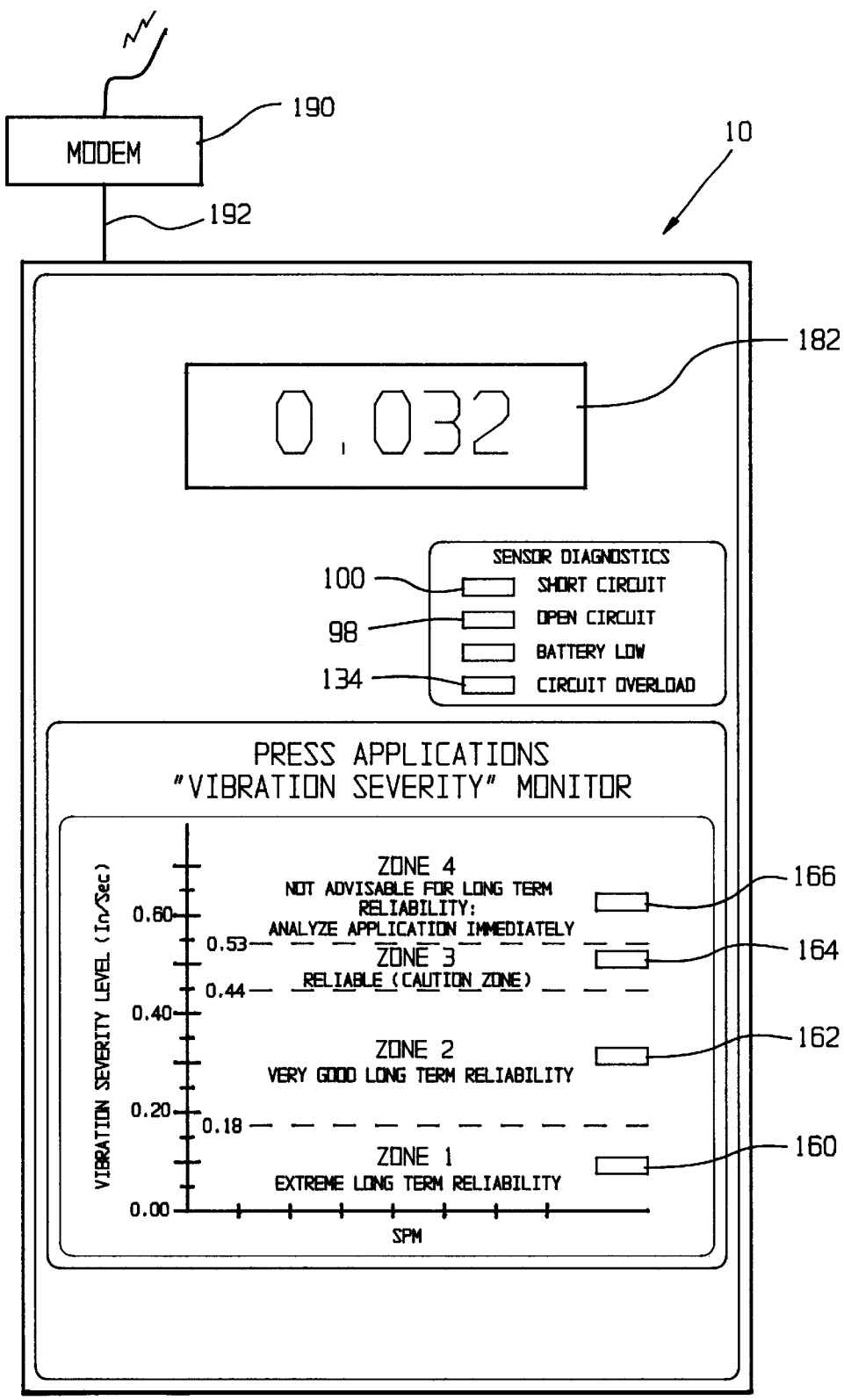
FIG. 4 is a front view of an alternate embodiment of the hand held device of the present invention connected to modem.

Additionally, connectivity of device 10 may include an add-on remote transmitting device such as modem 190 (FIG. 4) to send the computed vibration severity data to a central station or remote data storage center. Device 10 is connected to modem 190 via a line 192. In this case, device 10 would send via a modem 190 or other means, i.e., wireless communicator, Internet, telephone system, local area network, Wide Area Network, the measured acceleration or computed velocity, acceleration or press displacement to a distant digital storage unit. Known methods are used for sending the digital signal values via the remote transmitting device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hand held device attachable to a mechanical press to measure press conditions including vibration severity zone, said device comprising:
   an accelerometer for measuring press conditions and creating a corresponding signal;
   a hand held signal processing means for processing said corresponding signal, said signal processing means connected to said accelerometer to process said corresponding signal, said signal processing means comprising:
      an acceleration processing means for calculating a press acceleration signal;
      a velocity processing means for calculating a press velocity signal;
      a displacement processing means for calculating a press displacement signal;
      a highpass filter, said highpass filter forming a part of said velocity processing means, said highpass filter having a frequency band whereby lower frequency signals are removed to prevent interference of press inertia effects when measuring the vibration severity zone of the press;
      a display means for displaying at least one of said calculated signals; and
      a switch connecting said acceleration, velocity, and displacement processing means together and permitting an operator to select one of said calculated signals for input to said display means.

2. The device of claim 1 in which said display means comprises a means for measuring the voltage of said calculated signals and displaying said voltage representing a press condition.

3. The device of claim 1 in which said display means includes a plurality of LED's arranged to illuminate at separate predefined applied voltage ranges whereby an illuminated LED represents a particular range for a signal input to said display means.

4. The device of claim 3 in which said LED'S illuminate in different colors depending on the predefined applied voltage range.

5. The device of claim 1 in which said acceleration processing means includes a first order highpass filter.

6. The device of claim 1 in which said velocity processing means comprises a signal integrator, a first order highpass filter, a second order highpass filter, and a first order highpass filter in series.

7. The device of claim 1 in which said displacement processing means comprises a signal integrator, a first order highpass filter, a second order highpass filter, a second signal integrator, and a second first order highpass filter in series.

8. The device of claim 1 in which said signal processing means includes a second order low pass filter that reduces high frequency signals applied to said display means.

9. The device of claim 1 in which said frequency band of said highpass filter is above approximately 30 hertz.

10. A method of monitoring vibration severity levels in a press comprising:
   providing a hand held monitoring device that visually indicates press vibration severity levels in zone wise fashion;
   attaching a press sensor to said press;
   connecting said press sensor to said monitoring device;
   running the press; and
   determining the vibration severity level based on the zone wise visual indicator on said monitoring device.

11. The method of claim 10, wherein said press sensor is an accelerometer.

12. A hand held device attachable to a mechanical press to measure press conditions from a press accelerometer corresponding signal, the measured press conditions including vibration severity zone, said device comprising:
- a hand held signal processing means for processing said corresponding signal said signal processing means in communication with the accelerometer to process said corresponding signal, said signal processing means comprising:
  - an acceleration processing means for calculating a press acceleration signal;
  - a velocity processing means for calculating a press velocity signal;
  - a displacement processing means for calculating a press displacement signal;
  - a highpass filter, said highpass filter forming a part of said velocity processing means, said highpass filter having a frequency band whereby lower frequency signals are removed to prevent interference of press inertia effects when measuring the vibration severity zone of the press;
  - a display means for displaying at least one of said calculated signals; and
  - a switch connecting said acceleration, velocity, and displacement processing means together and permitting an operator to select one of said calculated signals for input to said display means.

13. The device of claim 12 in which said display means comprises a means for measuring the voltage of said calculated signals and displaying said voltage representing a press condition.

14. The device of claim 12 in which said display means includes a plurality of LED's arranged to illuminate at separate predefined applied voltage ranges whereby an illuminated LED represents a particular range for a signal input to said display means.

15. The device of claim 14 in which said LED's illuminate in different colors depending on the predefined applied voltage range.

16. The device of claim 12 in which said acceleration processing means includes a first order highpass filter.

17. The device of claim 12 in which said velocity processing means comprises a signal integrator, a first order highpass filter, a second order highpass filter, and a first order highpass filter in series.

18. The device of claim 12 in which said displacement processing means comprises a signal integrator, a first order highpass filter, a second order highpass filter, a second signal integrator, and a second first order highpass filter in series.

19. The device of claim 12 in which said signal processing means includes a second order low pass filter that reduces high frequency signals applied to said display means.

20. The device of claim 12 in which said frequency band of said highpass filter is above approximately 30 hertz.

21. A hand held device attachable to a mechanical press to measure press conditions from a press accelerometer corresponding signal, said device comprising:
- a hand held signal processing means for processing said corresponding signal said signal processing means in communication with the accelerometer to process said corresponding signal, said signal processing means comprising:
  - an acceleration processing means for calculating a press acceleration signal;
  - a velocity processing means for calculating a press velocity signal;
  - a highpass filter, said highpass filter forming a part of said velocity processing means, said highpass filter having a frequency band whereby lower frequency signals are removed to prevent interference of press inertia effects when measuring the vibration severity zone of the press;
  - a display means for displaying at least one of said calculated signals; and
  - a switch connecting said acceleration and velocity processing means together and permitting an operator to select one of said calculated signals for input to said display means.

22. The device of claim 21 in which said display means comprises a means for measuring the voltage of said calculated signals and displaying said voltage representing a press condition.

23. The device of claim 21 in which said display means includes a plurality of LED's arranged to illuminate at separate predefined applied voltage ranges whereby an illuminated LED represents a particular range for a signal input to said display means.

24. The device of claim 23 in which said LED's illuminate in different colors depending on the predefined applied voltage range.

25. The device of claim 21 further including a time filtered RMS conversion means to convert said velocity signal to an indication of press vibration severity.

26. A device for monitoring the long-term reliability condition of a press, said device comprising:
- an accelerometer for measuring press conditions and creating a corresponding signal;
- a hand held signal processing means for processing said corresponding signal, said signal processing means connected to said accelerometer to process said corresponding signal, said signal processing means comprising a means for monitoring and calculating the vibration severity magnitude velocity induced in the press and the vibration severity zone corresponding to the vibration severity magnitude velocity; and
- a display means for displaying said vibration severity magnitude velocity.

27. The device of claim 26 in which said display means includes a plurality of light emitting diodes that illuminate depending on in which vibration severity zone said calculated vibration severity magnitude velocity falls.

* * * * *

UNITED STATES PATENT AND TRADEMARK OFFICE
CERTIFICATE OF CORRECTION

PATENT NO. : 6,209,400 B1
DATED : April 3, 2001
INVENTOR(S) : Schoch et al.

It is certified that error appears in the above-identified patent and that said Letters Patent is hereby corrected as shown below:

Title page,
Item [75], please delete "Kevin J. Ever," and replace with -- Kevin J. Evers, --.

Signed and Sealed this

Thirteenth Day of November, 2001

Attest:

*Nicholas P. Godici*

NICHOLAS P. GODICI
*Attesting Officer*    *Acting Director of the United States Patent and Trademark Office*